(12) United States Patent
Carter

(10) Patent No.: US 8,374,923 B2
(45) Date of Patent: Feb. 12, 2013

(54) WEB SERVICE FOR GENERATING PORTABLE MULTIMEDIA PRESENTATIONS

(76) Inventor: Jeffery L. Carter, Colorado Springs, CO (US)

( * ) Notice: Subject to any disclaimer, the term of this patent is extended or adjusted under 35 U.S.C. 154(b) by 372 days.

(21) Appl. No.: 12/720,495

(22) Filed: Mar. 9, 2010

(65) Prior Publication Data

US 2011/0225066 A1 Sep. 15, 2011

(51) Int. Cl.
*G06Q 30/00* (2012.01)
(52) U.S. Cl. ........ 705/27.1; 705/26.1; 705/26.8; 705/14.4; 705/300; 715/716; 715/867; 715/236; 715/239
(58) Field of Classification Search ............ 705/26.1, 705/27.1, 26.8, 300, 14.4; 715/867, 716, 715/236, 239
See application file for complete search history.

(56) References Cited

U.S. PATENT DOCUMENTS

| | | | |
|---|---|---|---|
| 2002/0111972 A1* | 8/2002 | Lynch et al. | 707/523 |
| 2007/0156521 A1* | 7/2007 | Yates | 705/14 |
| 2008/0229257 A1* | 9/2008 | White | 715/867 |
| 2008/0304808 A1* | 12/2008 | Newell et al. | 386/52 |
| 2009/0177967 A1* | 7/2009 | Moore et al. | 715/716 |
| 2011/0022449 A1* | 1/2011 | Bourne | 705/14.4 |

* cited by examiner

*Primary Examiner* — Yogesh C Garg
(74) *Attorney, Agent, or Firm* — Sheridan Ross PC

(57) ABSTRACT

A software application executed at a user computer and/or server allows a user to select one or more multimedia files. The multimedia files may be provided at the user computer, sold at the server, or procured from a third party provider. The user can arrange the multimedia files into a presentation. A user can then specify a display device that will be used to present the multimedia presentation. The display device can be a television, portable media player, a computer, or other device. The system can translate the multimedia presentation into a format compatible with the device. Thus, the user is provided with a simple system to create multimedia presentation and receive the file in a format compatible with a device.

23 Claims, 11 Drawing Sheets

WEB SERVICE FOR GENERATING PORTABLE MULTIMEDIA PRESENTATIONS

BACKGROUND

Consumers have numerous options for devices that can display multimedia presentations. For example, users may be able to show a slideshow on a computer or a movie or slideshow on a digital television. Many of these devices allow a user to produce custom presentations to display on the devices. However, creating these presentations can be difficult. Further, it is often difficult for the consumer to generate a presentation that will execute on particular devices. Consumers may also wish to use their own multimedia files to create the presentations. However, using personal multimedia files is also difficult.

SUMMARY

It is with respect to the above issues and other problems that the embodiments presented herein were contemplated. Herein, a software application, executed at a user computer and/or server, allows a user to select one or more multimedia files. The multimedia files may be provided at the user computer, sold at the server, or procured from a third party provider. The user can arrange the multimedia files into a presentation. A user can then specify a display device that will be used to present the multimedia presentation. The display device can be a television, portable media player, a computer, or other device. The system can translate the multimedia presentation into a format compatible with the device. Thus, the user is provided with a simple system to create multimedia presentation and receive the file in a format compatible with a device.

The phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that aspects of the invention can be separately claimed.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the invention. Rather, the ensuing description will provide those skilled in the art with an enabling description for implementing the embodiments. It should be understood that various changes may be made in the function and arrangement of elements, without departing from the spirit and scope of the invention, as set forth in the appended claims.

Figure 1:
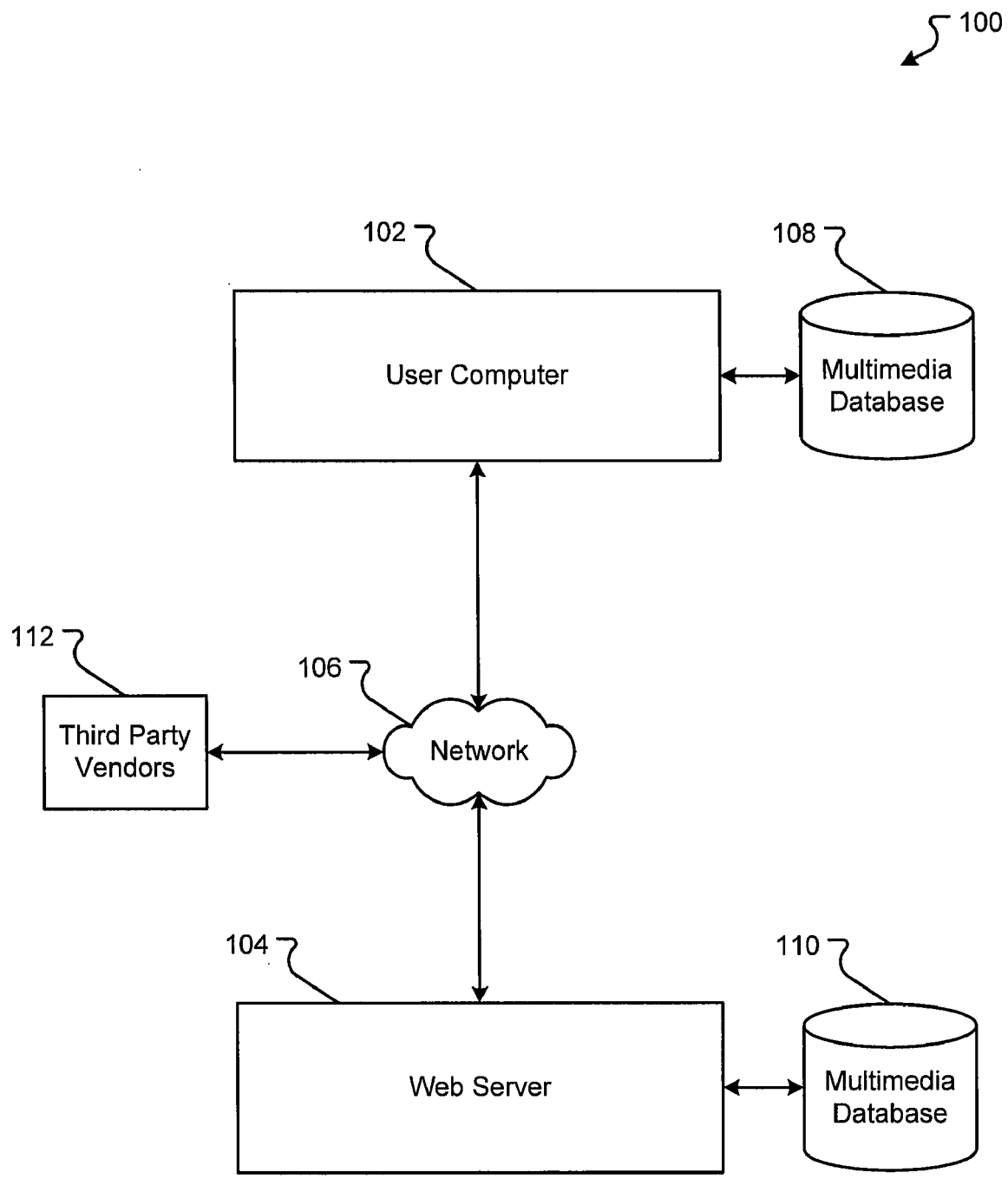
FIG. 1 is a block diagram of an embodiment of a system to create a multimedia presentation.

A system 100 for creating presentations is shown in FIG. 1. The several components of the system 100 may be hardware, software, or a combination of hardware and software. Descriptions of the computer system environment and the computer systems which may embody the several components of system 100 are described in conjunction with FIGS. 8 and 9. As such, a functional description of the several components of system 100 shall follow. Two or more components or systems described hereinafter may be in communication. "In communication" can mean any connection or interaction between the components or systems over a network or other system, whether wired or wireless, using any protocol or format of communication.

The system 100 includes a user computer 102 and a web server 104 in communication through a network 106. The user computer 102 can be any computing system operable to execute functions for a user (as described in conjunction with FIGS. 8 and 9). A web server 104 is a server computer that may execute on a computing system (as described in conjunction with FIGS. 8 and 9) to provide web services or other functions over a network 106. The network 106 can be any network including a local area network (LAN), a wireless LAN, a wide area network (WAN), the Internet, an intranet, etc. The network 106 may be as described in conjunction with FIG. 8.

Figure 2A:
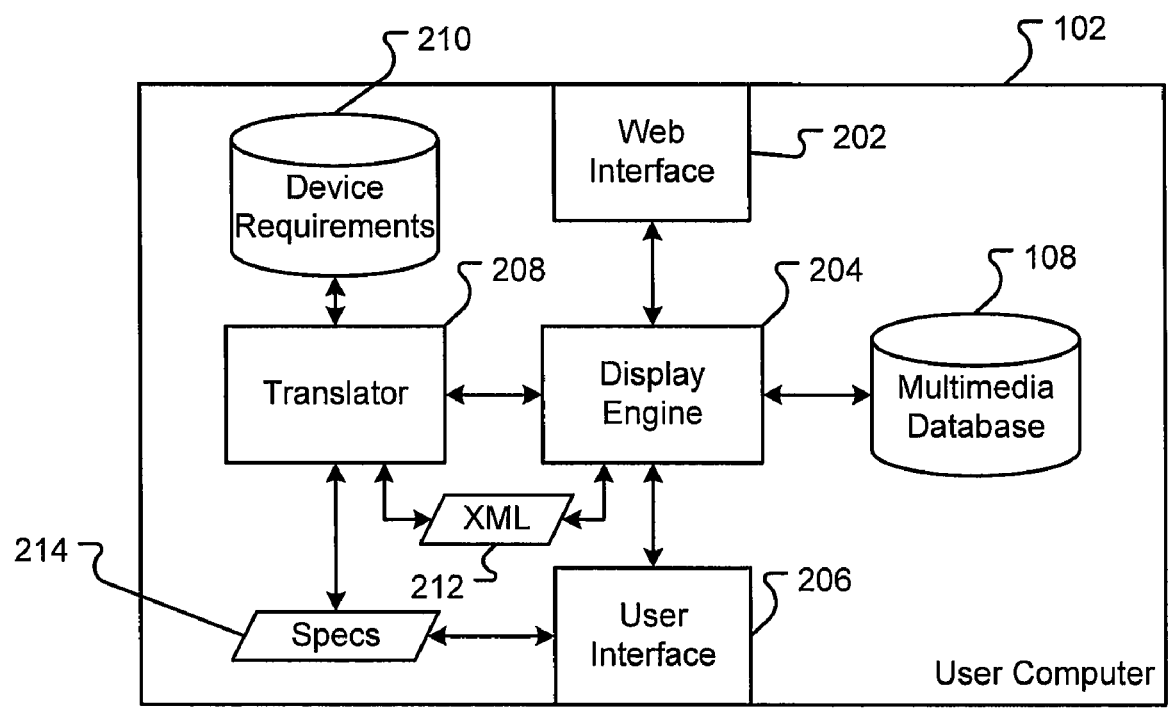
FIG. 2A is a block diagram of an embodiment of a user computer that can generate a multimedia presentation.
Figure 2B:
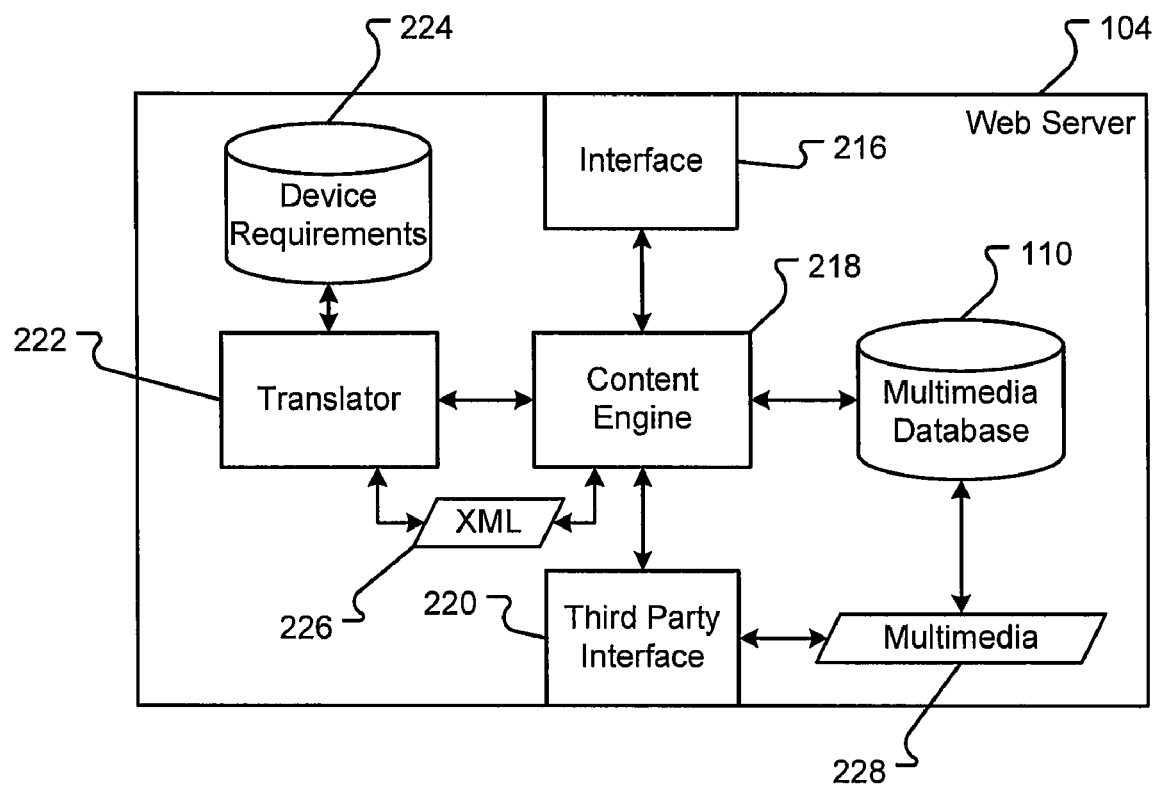
FIG. 2B is a block diagram of an embodiment of a web server that can generate a multimedia presentation.

Both the user computer 102 and the web server 104 can execute software components as described in conjunction with FIGS. 2A and 2B. However, in embodiments, more components are executed either at the user computer 102 or the web server 104 depending on the amount of processing pushed to the user computer 102. In other words, the user computer 102 may execute a thin client while the web server 104 executes the majority of the processing. Alternatively, the web server 104 may download a more robust software application to the user computer 102 and the user computer 102 completes more of the processing. Thus, in the embodiments described in conjunction with FIGS. 2A and 2B, the arrangement of the software components and whether the user computer 102 or the web server 104 executes the component can be different for different embodiments.

In embodiments, the user computer 102 and web server 104 execute together to create multimedia presentations. To create the multimedia presentations, the user computer 102 can retrieve and insert multimedia files from a multimedia database 108 into the presentation. The multimedia database 108 can be any type of database as described in conjunction with FIG. 8 that can be stored in memory. The multimedia database 108 can store multimedia files including one or more of, but not limited to, a picture (in JPEG, TIFF, or other format), a digital song (in AAU or other format), a video (in MPEG4 or other format), a graphic, etc. Likewise, the web server 104 can retrieve and insert multimedia files from a multimedia database 110 into the presentation. The multimedia database 108 can be any type of database as described in conjunction with FIG. 6 that can be stored in memory. The multimedia database 110 can store multimedia files including one or more of, but not limited to, a picture (in JPEG, TIFF, or other format), a digital song (in AAU or other format), a video (in MPEG4 or other format), a graphic, etc.

The system 100 can also include one or more third party vendors 112. A third party vendor 112 can be another server or computer system that communicates either with the user computer 102 or the web server 104 through the network 106. The third party vendor 112 can provide more or other multimedia files or data to the user computer 102 or the web server 104 for inclusion in the multimedia presentation. The multimedia files provided by the third party vendor 112 can be sold or free.

An embodiment of a user computer 102 is shown in FIG. 2A. The user computer 102 can include one or more components. The components can be hardware and/or software modules executed in a processor of a computer system as explained in conjunction with FIGS. 8 and 9 and/or embodied logic circuits in a specially-designed hardware systems, such as an application specific integrated circuit (ASIC) or a field programmable gate array (FPGA). In embodiments, the user computer 102 includes a web interface 202. The web interface 202 is a module for sending and receiving communications over the network 106. The web interface 202 may send or receive communications in any format using any protocol, for example, TCP/IP. Similarly, the user interface 206 is a module for sending and receiving communications over one or more user interfaces described in conjunction with FIG. 9. The user interface 206 may send or receive communications in any format using any protocol, for example, TCP/IP, USB, etc.

A display engine 204 can create multimedia presentations. During a session with the user, the display engine 204 can receive selections of one or more multimedia files to compose into a multimedia presentation. The display engine arranges the files into a presentation and can produce a presentation file. The presentation file can be an XML file 212 or other file. In embodiments, the display engine 204 communicates with the user interface 206 to receive selections of the multimedia files. The multimedia files may be stored in a local multimedia database 108 or provided by the web server 104 or third party vendor 112 over the web interface 202. A composed multimedia presentation may be stored by the display engine 204 into the multimedia database 108 or sent to the web server 104 over the web interface 202 or to a translator 208.

In embodiments, the translator 208 receives a multimedia presentation that has a general format, such as XML file 212. To create an executable presentation, the translator 208 can translate the generally formatted presentation into a specially-formatted presentation executable by a display system. For example, a television may be able to display an MPEG4 file but not a slideshow presentation in a Microsoft® PowerPoint® format. To ensure that the presentation is displayable, the display engine 204 may ask the user for the device that the user will use to display the presentation. The device specifications 214 are sent to the translator 208 by the user interface 206. The device specifications 214 may specify the device that will display the presentation, e.g., Sony Bravia Television Model A2. To determine formats displayable by the device, the translator 208 can access a device requirements database 210 that includes the specifications for the capabilities of the device. Then, the translator 208 can create the specially-formatted presentation. The display engine 204 may then provide the specially-formatted presentation to the user interface 206 for the user or to another device for the user to store the presentation for use with the specified device.

An embodiment of a web server 104 is shown in FIG. 2B. The web server 104 can include one or more components. The components can be hardware and/or software modules executed in a processor of a computer system as explained in conjunction with FIGS. 8 and 9 and/or embodied as logic circuits in a specially-designed hardware system, such as an application specific integrated circuit (ASIC) or a field programmable gate array (FPGA). In embodiments, the web server 104 includes an interface 216. The interface 216 is a module for sending and receiving communications or data over the network 106. The interface 216 may send or receive communications in any format using any protocol, for example, TCP/IP. In an embodiment, the interface 216 is a web interface. Similarly, the third party interface 220 is a module for sending and receiving communications to one or more third party vendors 112 over a network 106. The interface 220 may send or receive communications in any format using any protocol, for example, TCP/IP.

A content engine 218 can create multimedia presentations. During a session with the user, the content engine 218 can receive selections of one or more multimedia files to compose into a multimedia presentation. The content engine 218 arranges the files into a presentation and can produce a presentation file. The presentation file can be an XML file 226 or other file. In embodiments, the content engine 218 communicates with the interface 216 to receive selections of the multimedia files. The multimedia files 228 may be stored in a local multimedia database 110 or provided by a third party vendor 112 over the third party interface 220. A composed multimedia presentation may be stored by the content engine 218 into the multimedia database 110, sent to the user computer 102 over the interface 216, or to a translator 222.

In embodiments, the translator 222 receives a multimedia presentation that has a general format, such as XML file 226. To create an executable presentation, the translator 222 can translate the generally formatted presentation into a specially-formatted presentation executable by a display system. To ensure that the presentation is displayable, the user computer 102 may ask the user for the device that the user will use to display the presentation. The device specifications 214 are sent to the interface 216 of the web server 104, then to the translator 222 by the interface 216. The device specifications may specify the device that will display the presentation, e.g., Sony Bravia Television Model A2. To determine formats displayable by the device, the translator 222 can access a device requirements database 224 that includes the specifications for the capabilities of the device. Then, the translator 222 can create the specially-formatted presentation. The content engine 218 may then provide the specially-formatted presentation to the interface 216 for transmission to the user computer 102 or to another device for the user to store the presentation for use with the specified device.

Figure 3:
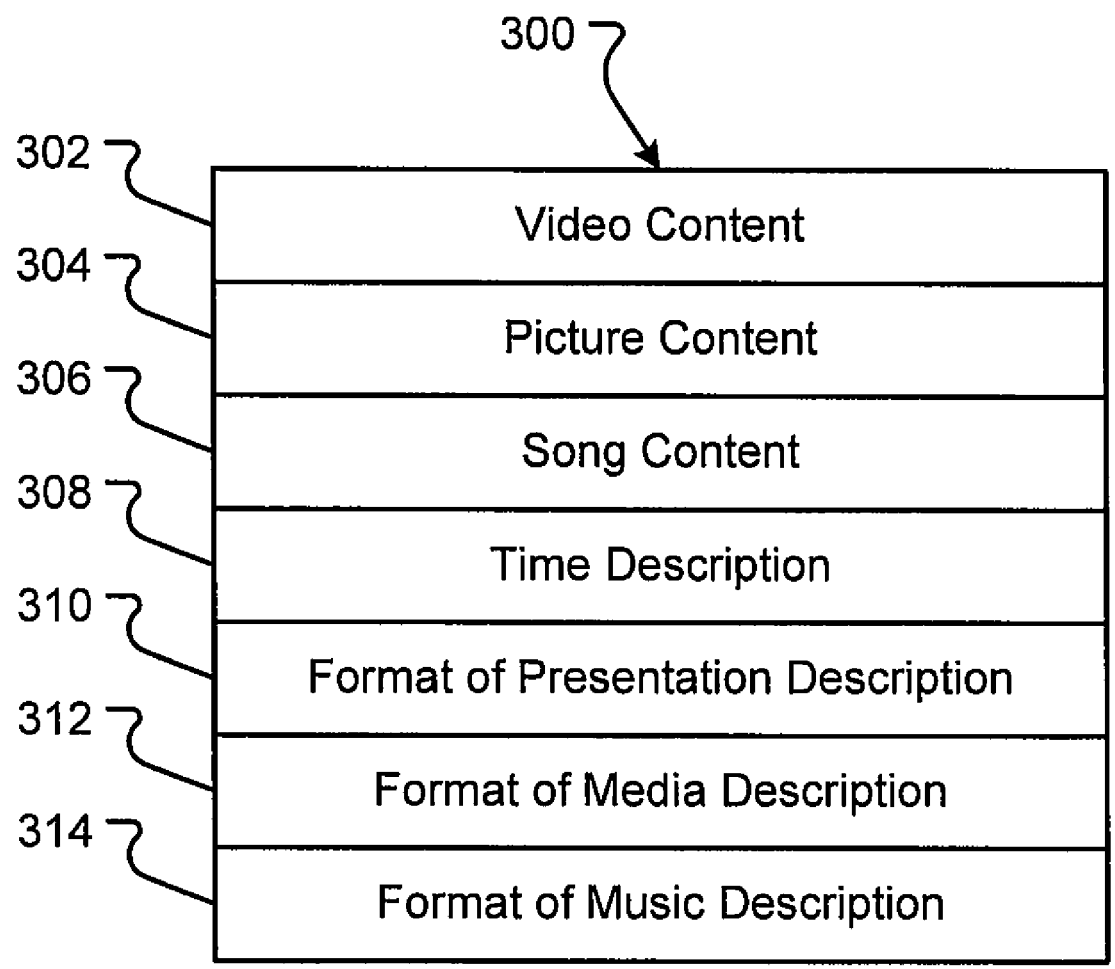
FIG. 3 is a block diagram of a data structure that is stored, sent, or received by one or more computer systems when generating a multimedia presentation.

An embodiment of a data structure 300 embodying a multimedia presentation 212 or 226 is shown in FIG. 3. A multimedia presentation 212 or 226 can be composed of two or more multimedia files and arranged by one or more format descriptions included in two or more data fields. There may be more or fewer data fields than those shown in FIG. 3. Each multimedia presentation 212 or 226 part can be a multimedia file. For example, multimedia presentation 212 or 226 comprises multimedia files 302, 304, and/or 306. The separate multimedia files 302, 304, and/or 306 are compiled and formatted into a single multimedia presentation 212 or 226 that has two or more multimedia files. The multimedia files 302, 304, and/or 306 can include the data for the multimedia content and other information, e.g., metadata, describing the content data. Multimedia data files 302 include video presentations. Multimedia data files 304 include pictures or static visual presentations (such as graphics). Multimedia data files 306 include music, sound, or song files. The files may be identified by an identifier, for example a globally unique identifier (GUID), in a header or metadata of the multimedia data.

The data structures 308 through 314 include formats or arrangements for the multimedia files 302, 304, and/or 306. The data structures 308 through 314 help define how the multimedia files 302, 304, and/or 306 will be presented. A time description 308 can describe at what time during the presentation a multimedia file is displayed or played. For example, a picture file in the picture content 304 may be displayed at time 0 plus 25 seconds and be displayed for 30 seconds. A song in the song content 306 may be played at time 0 for two minutes. Thus, both the picture and the song may be displayed or played at the same time for a duration of 30 seconds. In embodiments, the time description 308 stores a start time and duration with the GUID for each multimedia file used in the presentation.

A format of the presentation description field 310 can store information about how the presentation is structured. For example, the format of the presentation description field 310 can include the size of the window displaying the presentation, the type of transition between pictures or video (e.g., fade to black, enlarge for a corner, etc.), the type of transition between songs (e.g., one second gap between songs, overlap of three seconds between songs, etc.), and other information. Each transition may be described by recording a time related to a time in the time description 308, the one or more GUIDs for the multimedia files involved in the transition, and the type of transition or code for how to execute the transition. Other formats may be globally applied, such as the size of the display.

A format of the media description field 312 can describe how each visual multimedia file shall be displayed. For example, the format of the media description field 312 can include the size of the picture or video display, the resolution, etc. The format of the media description field 312 can record the GUID for each multimedia file and then one or more items of data describing how the multimedia file should be displayed.

A format of the music description field 314 can describe how each audio multimedia file shall be presented. For example, the format of the music description field 314 can include the volume of the song, the clarity (how detailed the song is) of the song, etc. The format of the music description field 314 can record the GUID for each multimedia file and then one or more items of data describing how the multimedia file should be presented.

Figure 4A:
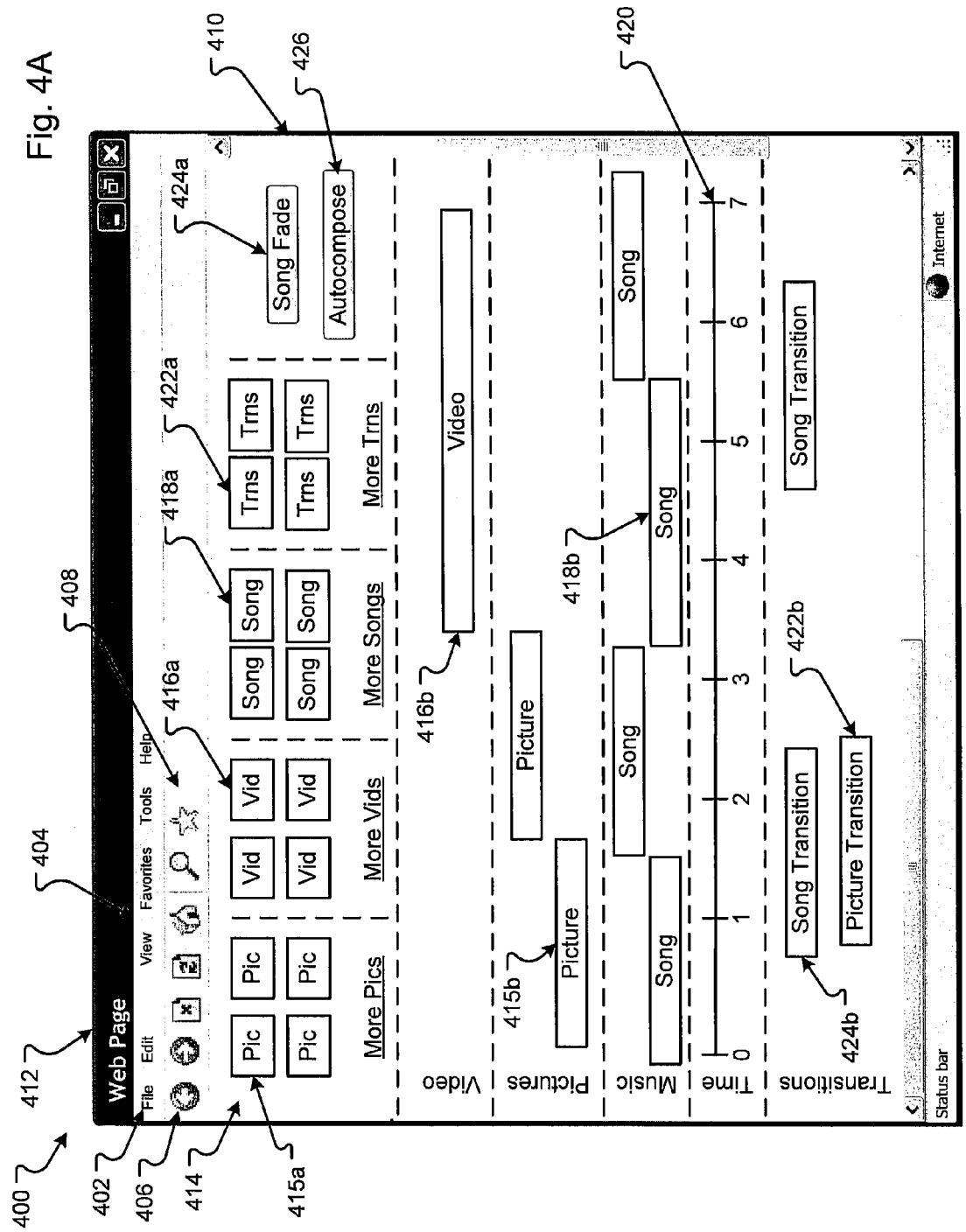
FIGS. 4A and 4B are user interface displays of embodiments of user interfaces used to generate a multimedia presentation.
Figure 4B:
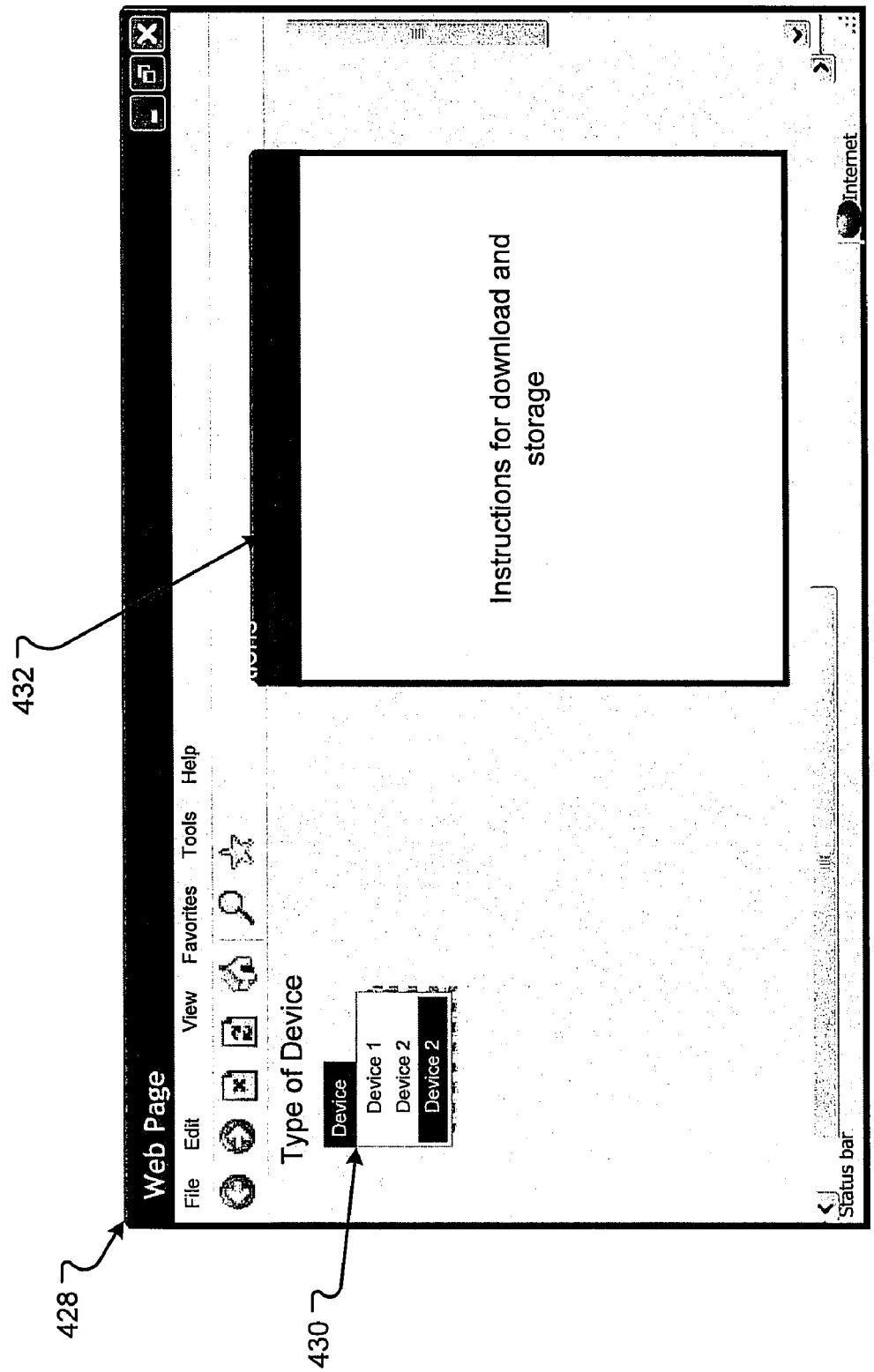

Embodiments of user interface displays 400 and 428 are shown in FIGS. 4A and 4B. Generally, a user interface display presents information to a user on a user computer 102. The user interface display may be of a web page or a display presented by an application executing on the user computer 102. The user interface display may also include one or more devices that allow a user to input information into an application. For example, the devices can include a menu 402 on a menu bar 404, a button 406 on a ribbon or other bar 408, a scroll bar 410, a radio button, an input field, devices to change the window 412, an area to display application specific information and devices 414, etc. The user interface displays 400 and 428 will be referenced to describe how the systems and methods execute. Generally, the user interface displays 400 and 428 can be displayed on a user interface display and interacted with input devices as described in conjunction with FIGS. 8 and 9.

Figure 5:
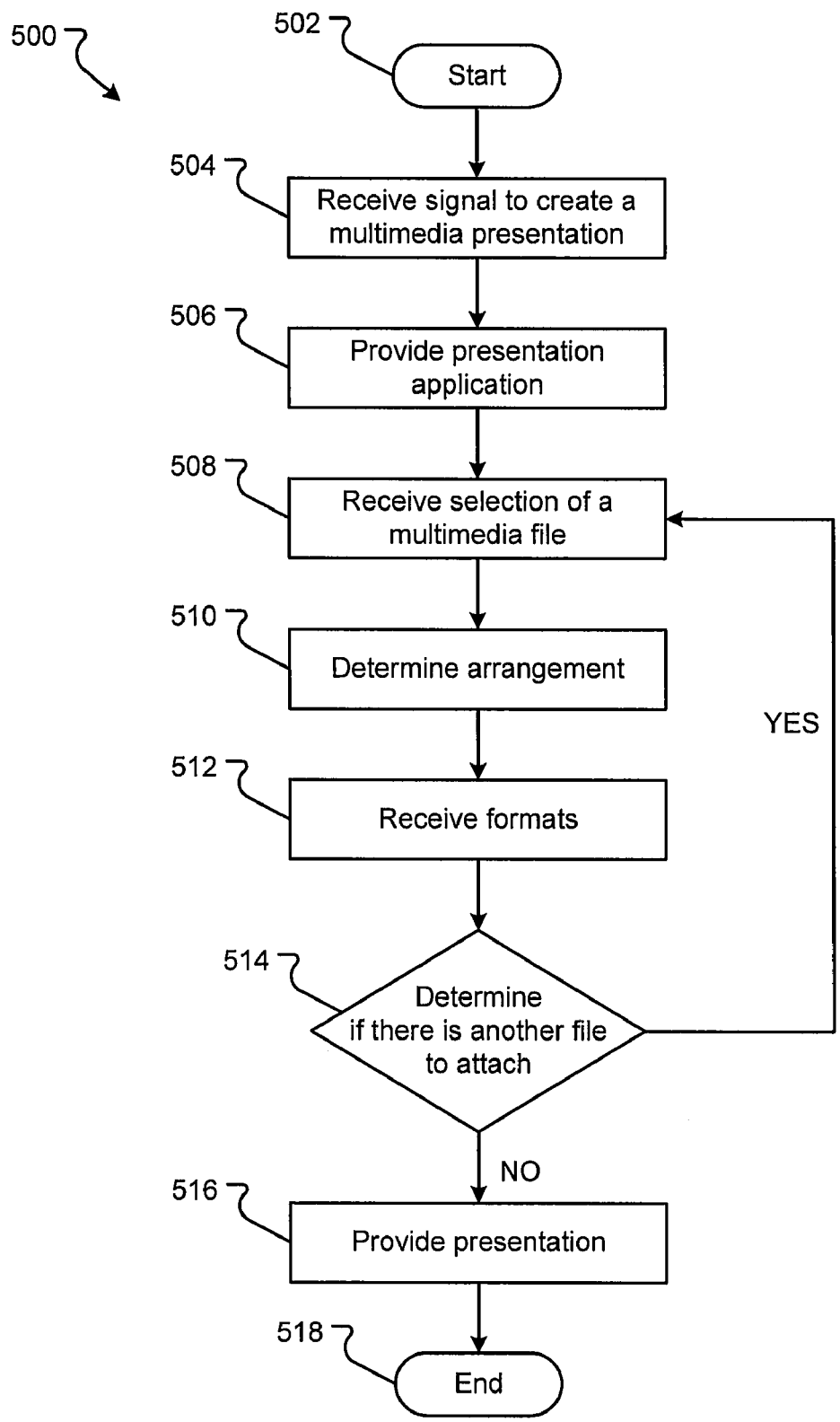
FIG. 5 is a flow diagram of an embodiment of a process for creating a multimedia presentation.

An embodiment of a method 500 for generating a multimedia presentation is shown in FIG. 5. Generally, the method 500 begins with a start operation 502 and terminates with an end operation 518. While a general order for the steps of the method 500 are shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, data structures, etc. described in conjunction with FIGS. 1-4B.

The user computer 102 and/or web server 104 receives a signal from a user to create a multimedia presentation, in step 504. The user may provide the signal with a user interface device in communication with the user computer 102. After receiving the signal from the user, the user computer 102 may forward the signal to the web server 104 through network 106. The signal may be entered into a web page with a request for creating a multimedia presentation sent to the web server 104. In other embodiments, the signal is to execute an existing application resident at the user computer 102.

The user computer and/or the web server 104 provides the presentation application, in step 506. The user computer 102 may execute the presentation application locally. In other embodiments, the web server 104 provides a thin client application to the user computer 102 to execute. A user interface is generated with the thin client and presented to the user with the user computer 102. However, the majority of the computing is completed at the web server 104. In other embodiments, the web server 104 sends at least a portion the presentation application to the user computer 102 through the network 106 to store and execute. The user computer 102 executes most of the application, with the web server 104 executing some processes. The presentation application may have one or more components described in conjunction with FIGS. 2A and 2B.

Figure 7:
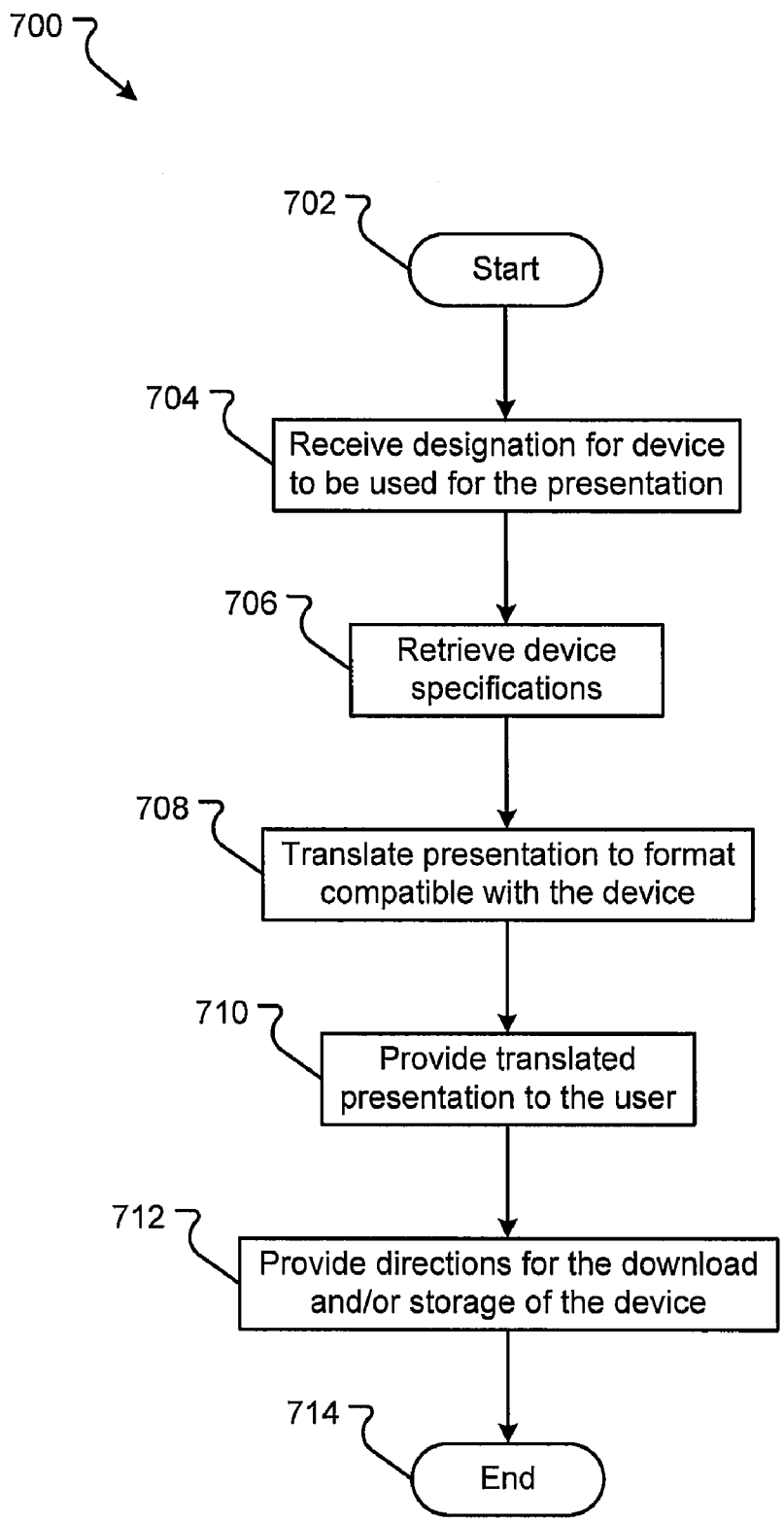
FIG. 7 is a flow diagram of an embodiment of a process for translating a multimedia presentation.

On a user interface, the user computer 102 receives a selection of a multimedia file, in step 508. In embodiments, the user interface 206 receives a selection of a multimedia file. The selection is passed to the display engine 204 or to a web interface 202 and directed to the web server. The selection of the multimedia file can be a mouse signal received when a cursor is over a picture 415, a video 416, or a song 418. The user can select the multimedia file and drag the file representation to the timeline 420. Where on the timeline the file is dropped can be the time when the user wants to show or play the file. The user can further select a boundary of the visual representation of the file and increase the vertical length of the file to select the duration of display or play for the file. The identity of the file can be stored in the presentation data structure 300 in the video content field 302, picture content field 304, or the song content filed 306. Embodiments of selecting a multimedia file are shown in FIG. 7.

The display engine 204 and/or the content engine 218 determines the arrangement of the presentation associated with the selected multimedia file, in step 510. The user interface 206 passes the user interface signals for the file, for example, where the file is placed on the timeline 420, the span (representing duration of play) of the file along the timeline, the identity of the multimedia file, etc. to the display engine 204 or the content engine 218. From the identity of the multimedia file, the display engine 204 or the content engine 218 can determine the characteristics of the multimedia file. The display engine 204 or the content engine 218 stores the start time, stop time, and/or duration of display or play of the multimedia file into the time description field 308.

The user interface 206 can also receive one or more formats, in step 512. A format can be a transition 422 (a visual change from one multimedia file to another multimedia file, such as, fade from a corner, window blinds effect, enlarge from center, etc.), song fade 424 (a change from one song to another song, such as, decreasing the volume on one song while increasing the song on another, three seconds of silence between songs, etc.), or other information of how the multimedia file will be presented. The transitions 422, song fade 424, and other formats are stored in the format of the presentation description 310. The characteristics necessary to display or play the multimedia file (e.g., the resolution of the picture, the type of video file, the type of song file, etc.) are stored in the format of media description 312 or the format of the music description 314. In embodiments, a user can select an autocompose button 426 to trigger an autocompose function. The autocompose function causes the display engine 204 or the content engine 218 to automatically create the arrangement of multimedia files and automatically select all transitions.

The display engine 204 or the content engine 218 then determines if there is another multimedia file to attach to the presentation, in step 514. The display engine 204 or the content engine 218 determines if the user selects another multimedia file that signals that another multimedia file is to be attached to the presentation. If the user selects a user interface device to complete the presentation, the display engine 204 or the content engine 218 can determine that there is not another multimedia file to attach to the multimedia presentation. If there is no other multimedia file to attach, the method 500 flows NO to step 516. However, if there is another multimedia file to attach, the method 500 flows YES back to step 508.

The display engine 204 or the content engine 218 can provide the presentation, in step 516. The display engine 204 or the content engine 218 may display the presentation to the user on a user interface 206. In other embodiments, the display engine 204 or the content engine 218 sends a file to the user to store and uploads the file to another display device to show the presentation. Embodiments of providing the presentation are explained in conjunction with FIG. 7.

Figure 6:
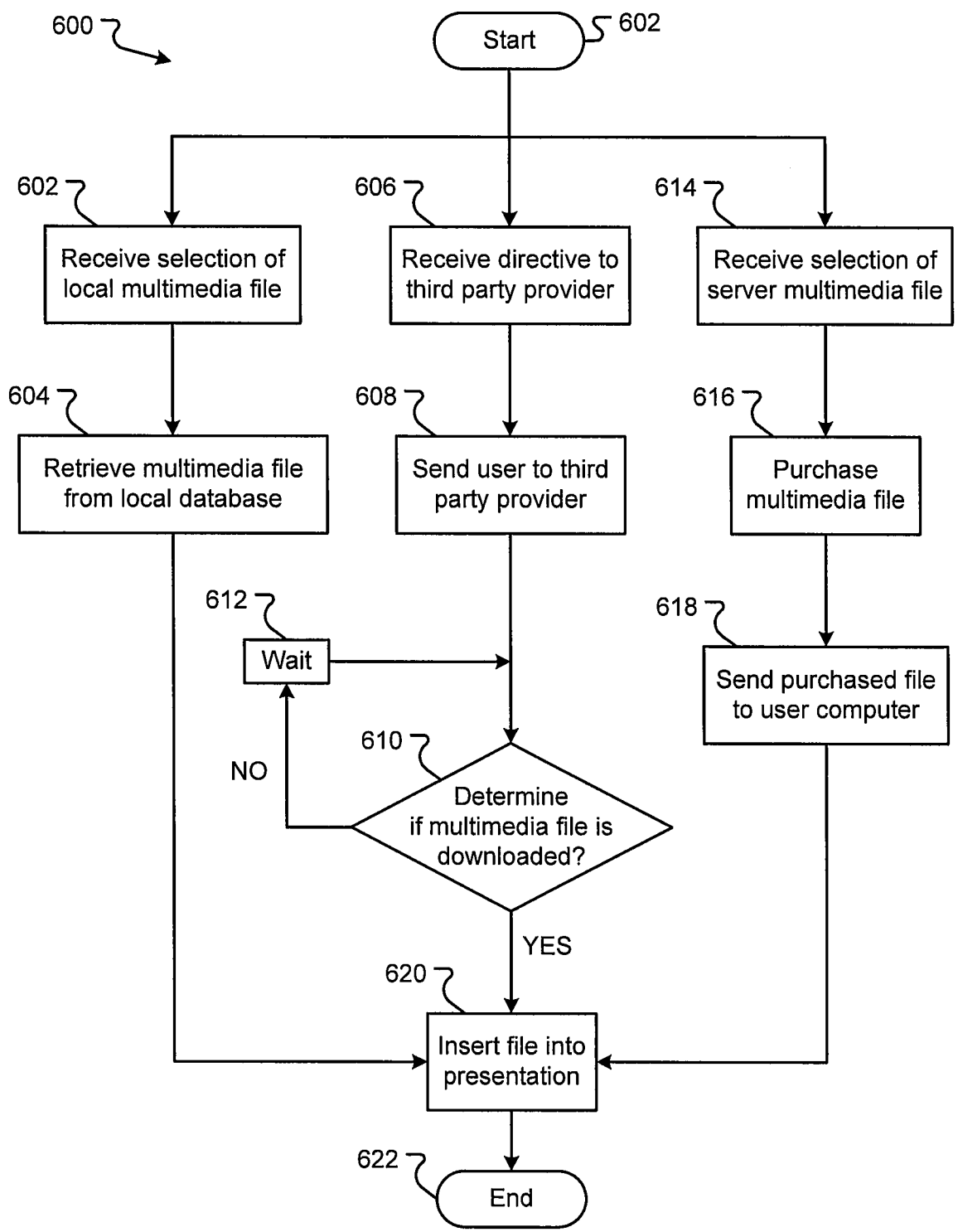
FIG. 6 is a flow diagram of an embodiment of a process for selecting a multimedia file.

An embodiment of a method 600 for selecting multimedia files for a multimedia presentation is shown in FIG. 6. Generally, the method 600 begins with a start operation 602 and terminates with an end operation 622. While a general order for the steps of the method 600 are shown in FIG. 6, the method 600 can include more or fewer steps or arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, data structures, etc. described in conjunction with FIGS. 1-4B.

The selection of a multimedia file can occur in at least three different ways. First, a display engine 204 can receive selection of a local multimedia file, in step 603. The local multimedia file can be stored at a multimedia database 108 at the user computer 102. The display engine 204 can provide a representation of the multimedia file on the user interface 400. The user can select the multimedia file by selecting one of a picture 415, a video 416, or a song 418 that is stored locally. The display engine 204 may then retrieve the multimedia file from the local database 108, in step 604. Here, the display engine 204 determines the identity of the multimedia file selected and retrieves the identified file from the database 108.

In another embodiment, the user interface 206 receives a directive to go to a third party provider 112, in step 606. The display engine 204 can send the directive to the web interface 202 to send the directive to the web server 104. The directive can be a selection of a third party universal resource locator (URL). The interface 216 of the web server 104 can receive the directive and send the directive to the content engine 218. The content engine 218 may determine which third party provider 112 is to receive the directive. Then, the content engine 218 can send the directive to the third party interface 220 to communicate with the third party provider 112.

The third party interface 220 can send the user to the third party provider 112, in step 608. Here, the user may communicate with the third party provider 112 through the web server 104. As such, the content engine 218 can determine if the user selects a multimedia file to download from the third party provider 112. In alternative embodiment, the display engine 204 receives the downloaded file and stored the file into the multimedia database 108. Thus, the content engine 218 or the display engine 204 can determine if a multimedia file has been downloaded from the third party provider 112, in step 610. If a multimedia file has been downloaded, the method 600 flows YES to step 620. If a multimedia file has not been downloaded, the method 600 flows no to wait for a predetermined period of time, in step 620. In embodiments, the display engine 204 or the content engine 218 can determine if no file is downloaded by the user cancelling the communication with the third party provider 112.

Another embodiment includes the content engine 218 receiving a selection of a multimedia file from the server 106, in step 614. The multimedia file can also be stored at a multimedia database 110 at the server computer 106. The content engine 218 or the display engine 204 can provide a representation of the multimedia file on the user interface 400. The user can select the multimedia file, by selecting one of a picture 415, a video 416, or a song 418, which are stored on the server 106. The content engine 218 may then complete a purchase process for the multimedia file, in step 616. Here, a payment may be accepted by the content engine 218 for the one or more multimedia files selected from the multimedia database 110. In this way, third parties may contract with the organization responsible for the web server to sell their multimedia files. For example, artists can use the web server 106 to sell digital depictions of paintings or songs.

The content engine 218 can then send the file to the user computer 102, in step 618. The, content engine 218 can send the file(s) to the interface 216 to send to the web interface 202 of the user computer 102. The interface 216 can download the file(s) to the web interface 202. After receiving the file, the display engine 204 can store the received files from the web interface 202 to the local multimedia database 108.

The display engine 204 can then take the received or retrieved file, regardless of the multimedia file's origin, and insert the multimedia file into the presentation, in step 620. In embodiments, the display engine 204 includes the identity of the multimedia file in the data structure 300.

An embodiment of a method 700 for generating a multimedia presentation is shown in FIG. 7. Generally, the method 700 begins with a start operation 702 and terminates with an end operation 714. While a general order for the steps of the method 700 are shown in FIG. 7, the method 700 can include more or fewer steps or arrange the order of the steps differently than those shown in FIG. 7. The method 700 can be executed as a set of computer-executable instructions executed by a computer system and encoded or stored on a computer readable medium. Hereinafter, the method 700 shall be explained with reference to the systems, components, modules, data structures, etc. described in conjunction with FIGS. 1-4B.

The display engine 204 or the content engine 218 can receive a designation 214 for a display device to which the user will display the presentation, in step 704. The user can use a user interface device 430 to select a device to which the presentation will be displayed. For example, the user may select a television, a digital video recorder, a computer, a personal digital assistant, or a portable media player. Further, the user can select a specific model of device. A translator 208 or the display engine 204 can receive the specifications 214.

From the selection of the device, the display engine 204 or the content engine 218 can retrieve the specifications for the display device, in step 706. The display engine 204 or the translator 208 can retrieve specifications for the selected device from a device requirements database 210. In other embodiments, the content engine 218 or translator 22 can retrieve specifications for the selected device from a device requirements database 224.

A translator 208 or 222 can receive a standard presentation file 212 or 226, which can contain the data in the data structure 300. The translator 208 or 222 can translate the standard presentation file 212 or 226 into a format compatible with the display device, in step 708. The compatible form of the presentation is defined by the device specifications retrieved in step 706.

In embodiments, the display engine 204 or the content engine 218 receives the translated file and can provide the translated presentation to the user, in step 710. The display engine 204 or the content engine 218 can provide a file to the user that the user can download and store to a storage device. The storage device can be used with the display device. Further, the display engine 204 or the content engine 218 can provide directions for the download and/or storage of the presentation for the device, in step 712. In embodiments, the display engine 204 or the content engine 218 provides a display 432 that explains to the user how to download or store the file and/or how to use the file with the device.

Figure 8:
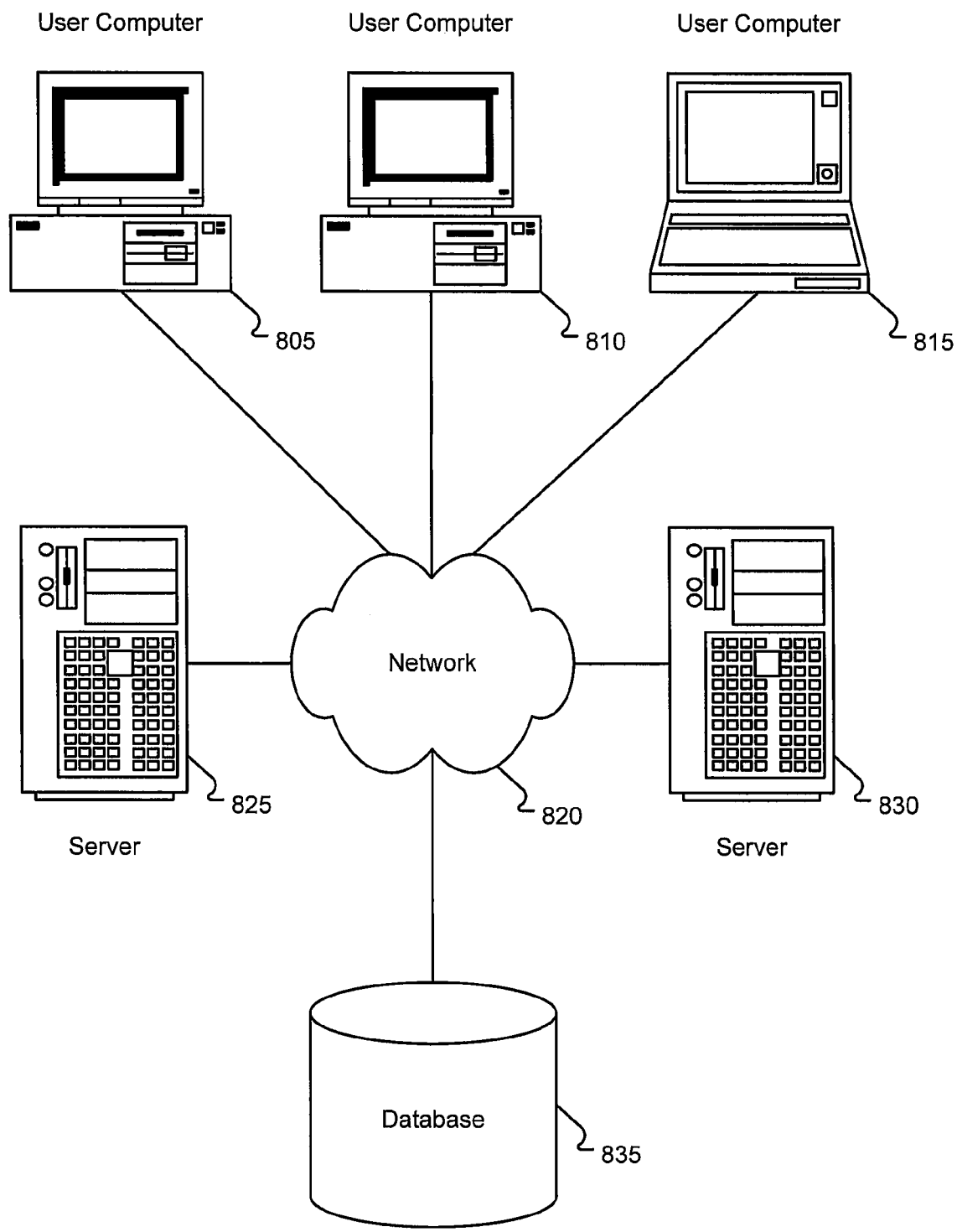
FIG. 8 is a block diagram of an embodiment of a computer system environment in which the systems and methods may be executed.

FIG. 8 illustrates a block diagram of a system 800 that may function as system 100 to provide decomposed composite multimedia streams. The system 800 includes one or more user computers 805, 810, and 815. The user computers 805, 810, and 815 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 805, 810, 815 may also have any of a variety of applications, including for example, database client and/or server applications, and web browser applications. Alternatively, the user computers 805, 810, and 815 may be any other electronic device, such as a thin client computer, Internet-enabled mobile telephone, and/or personal digital assistant, capable of communicating via a network (e.g., the network 820 described below) and/or displaying and navigating web pages or other types of electronic documents. Although the exemplary system 800 is shown with three user computers, any number of user computers may be supported.

System 800 further includes a network 820. The network 820 may can be any type of network familiar to those skilled in the art that can support data communications using any of a variety of commercially-available protocols, including without limitation, TCP/IP, SNA, IPX, AppleTalk, and the like. Merely by way of example, the network 820 maybe a local area network ("LAN"), such as an Ethernet network, a Token-Ring network and/or the like; a wide-area network; a virtual network, including without limitation, a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks. The network 820 may be the same or similar to network 104.

The system may also include one or more server computers 825, 830. One server may be a web server 825, which may be used to process requests for web pages or other electronic documents from user computers 805, 810, and 820. The web server can be running an operating system including any of those discussed above, as well as any commercially-available server operating systems. The web server 825 can also run a variety of server applications, including HTTP servers, FTP servers, CGI servers, database servers, Java servers, and the like. In some instances, the web server 825 may publish operations available operations as one or more web services.

The system 800 may also include one or more file and or/application servers 830, which can, in addition to an operating system, include one or more applications accessible by a client running on one or more of the user computers 805, 810, 815. The server(s) 830 may be one or more general purpose computers capable of executing programs or scripts in response to the user computers 805, 810 and 815. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 830 may also include database servers, including without limitation those commercially available from Oracle, Microsoft, Sybase™, IBM™ and the like, which can process requests from database clients running on a user computer 805.

The web pages created by the web application server 830 may be forwarded to a user computer 805 via a web server 825. Similarly, the web server 825 may be able to receive web page requests, web services invocations, and/or input data from a user computer 805 and can forward the web page requests and/or input data to the web application server 830. In further embodiments, the server 830 may function as a file server. Although for ease of description, FIG. 8 illustrates a separate web server 825 and file/application server 830, those skilled in the art will recognize that the functions described with respect to servers 825, 830 may be performed by a single server and/or a plurality of specialized servers, depending on implementation-specific needs and parameters. The computer systems 805, 810, and 815, file server 825 and/or application server 830 may function as the use computer 102, server 106 or third party provider 112, or other systems described herein.

The system 800 may also include a database 835, which may be the same or similar to multimedia databases 108 or 110. The database 835 may reside in a variety of locations. By way of example, database 835 may reside on a storage medium local to (and/or resident in) one or more of the computers 805, 810, 815, 825, 830. Alternatively, it may be remote from any or all of the computers 805, 810, 815, 825, 830, and in communication (e.g., via the network 820) with one or more of these. In a particular set of embodiments, the database 835 may reside in a storage-area network ("SAN") familiar to those skilled in the art. Similarly, any necessary files for performing the functions attributed to the computers 805, 810, 815, 825, 830 may be stored locally on the respective computer and/or remotely, as appropriate. In one set of embodiments, the database 835 may be a relational database, such as Oracle 10i™, that is adapted to store, update, and retrieve data in response to SQL-formatted commands.

Figure 9:
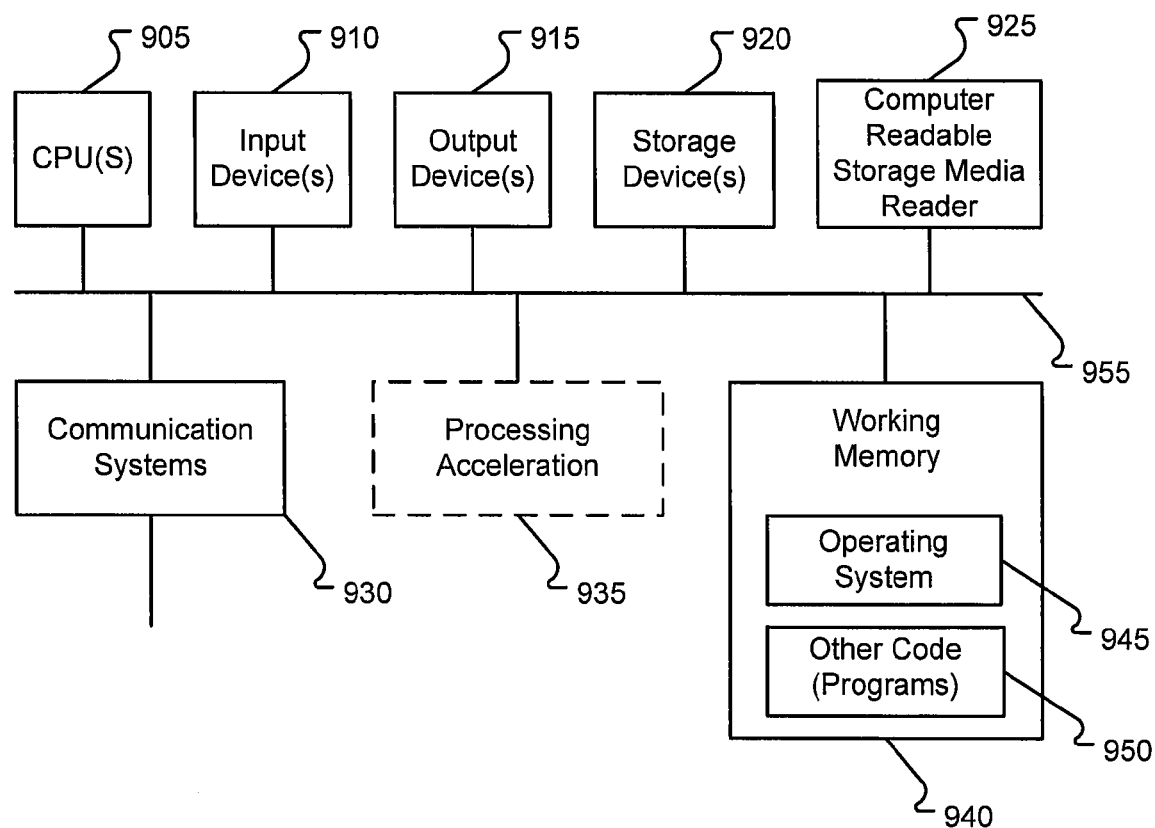
FIG. 9 is a block diagram of a computer system in which the systems and methods may be executed.

FIG. 9 illustrates one embodiment of a computer system 900 upon which the user computer 102, server 106, or other systems described herein may be deployed or executed. The computer system 900 is shown comprising hardware elements that may be electrically coupled via a bus 955. The hardware elements may include one or more central processing units (CPUs) 905; one or more input devices 910 (e.g., a mouse, a keyboard, etc.); and one or more output devices 915 (e.g., a display device, a printer, etc.). The computer system 900 may also include one or more storage device 920. By way of example, storage device(s) 920 may be disk drives, optical storage devices, solid-state storage device such as a random access memory ("RAM") and/or a read-only memory ("ROM"), which can be programmable, flash-updateable and/or the like.

The computer system 900 may additionally include a computer-readable storage media reader 925; a communications system 930 (e.g., a modem, a network card (wireless or wired), an infra-red communication device, etc.); and working memory 940, which may include RAM and ROM devices as described above. In some embodiments, the computer system 900 may also include a processing acceleration unit 935, which can include a DSP, a special-purpose processor, and/or the like The computer-readable storage media reader 925 can further be connected to a computer-readable storage medium, together (and, optionally, in combination with storage device(s) 920) comprehensively representing remote, local, fixed, and/or removable storage devices plus storage media for temporarily and/or more permanently containing computer-readable information. The communications system 930 may permit data to be exchanged with the network 920 and/or any other computer described above with respect to the system 900. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 900 may also comprise software elements, shown as being currently located within a working memory 940, including an operating system 945 and/or other code 950, such as program code implementing the use computer 102 or server 106. It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for generating a multimedia presentation, comprising:
   receiving first selections of a multimedia files to include in the multimedia presentation;
   determining an arrangement for the multimedia presentation and associated with the first multimedia file;
   determining a format for the multimedia presentation;
   providing the multimedia presentation, wherein the multimedia presentation is a screen saver displayed on a display device, and wherein the screensaver includes at least one song;
   receiving a second selection of a second multimedia file to include in the multimedia presentation, wherein the second multimedia file is selected from a group consisting of a song, a picture, a graphic, and a video, wherein the second multimedia file is stored on a server computer;
   determining a second arrangement for the multimedia presentation, wherein the second arrangement is associated with the second multimedia file;
   receiving a second format for the multimedia presentation, wherein the second format is associated with the second multimedia file;
   receiving a third selection of a third multimedia file to include in the multimedia presentation, wherein the third multimedia file is selected from a group consisting of a song, a picture, a graphic, and a video, wherein the third multimedia file is provided by a third party provider;
   determining a third arrangement for the multimedia presentation, wherein the third arrangement is associated with the third multimedia file;
   receiving a third format for the multimedia presentation, wherein the third format is associated with the third multimedia file;
   receiving a directive to send a user to the third party provider;
   sending the user to the third party provider;
   determining if the user has downloaded the third multimedia file from the third party provider; and
   storing the multimedia presentation in a computer memory; and
   wherein all the above recited steps are executed by a processor.

2. The method as defined in claim 1, wherein the multimedia files are selected from a group consisting of a song, a picture, a graphic, and a video.

3. The method as defined in claim 2, wherein the multimedia files are locally stored to a user computer.

4. The method as defined in claim 1, wherein the processor is part of a web server.

5. The method as defined in claim 1, wherein the processor is part of a user computer.

6. The method as defined in claim 1, wherein the processor receives the two or more selections of multimedia files, the arrangement, and the format to compose the multimedia presentation from a user interfacing with the processor through a user interface.

7. The method as defined in claim 6, wherein the user is an artist that composes the multimedia presentation and the artist sells the multimedia presentation.

8. The method as defined in claim 1, wherein the processor automatically determines the arrangement and the format to provide the multimedia presentation.

9. The method as defined in claim 1, wherein the second multimedia file is purchased from the server.

10. The method as defined in claim 9, wherein a third party provides the second multimedia file is provided to the server for purchase.

11. The method as defined in claim 1, wherein the display device is one of a group consisting of a television, a computer, a portable media player, and a digital video recorder.

12. The method as defined in claim 1, wherein providing the multimedia presentation comprises:
    the processor receiving a designation for the display device to be used to display the multimedia presentation;
    the processor retrieving a specification for the display device;
    the processor translating the multimedia presentation into a format compatible with the display device; and
    the processor providing the translated multimedia presentation to a user.

13. The method as defined in claim 12 further comprising the processor providing directions for one of a group consisting of the download, the storage, and the display of the translated multimedia presentation, wherein the directions instruct the user on how to display the translated multimedia presentation on the display device.

14. A system for generating a multimedia presentation comprising:
a server, in communication with a network, the server comprising:
a processor that reads and executes a computer executable module;
a memory, in communication with the processor, that stores the computer executable module and that sends the computer executable module to the processor; and
the computer executable modules comprising:
an interface that receives signals from the user computer;
a multimedia database that stores a multimedia file;
a content engine that:
receives a selection of a multimedia file to include in the multimedia presentation;
inserts the multimedia file into the multimedia presentation;
determines an arrangement for the multimedia presentation;
receives a format for the multimedia presentation;
provides the multimedia presentation to a user computer;
receives a second selection of a second multimedia file to include in the multimedia presentation;
determines a second arrangement for the multimedia presentation, wherein the second arrangement is associated with the second multimedia file;
receives a second format for the multimedia presentation, wherein the second format is associated with the second multimedia file;
receives a directive to send a user to a third party provider;
sends the user to the third party provider;
determines if the user has downloaded a third multimedia file from the third party provider;
receives the third multimedia file to include in the multimedia presentation, wherein the third multimedia file is provided by the third party provider;
determines a third arrangement for the multimedia presentation, wherein the third arrangement is associated with the third multimedia file; and
receives a third format for the multimedia presentation, wherein the third format is associated with the third multimedia file.

15. The system as defined in claim 14 further comprising:
a device requirements database;
a translator, in communication with the device requirements database and the content engine, that:
receives a designation for a display device to be used to display the multimedia presentation;
retrieves a specification for the display device;
translates the multimedia presentation into a format compatible with the display device; and
provides the translated multimedia presentation to a user.

16. The system as defined in claim 14, wherein the translator translates an XML file, representing the multimedia file, to a format compatible with the display device.

17. The system as defined in claim 16, wherein the XML file is a data structure comprising one or more of:
a video content field, wherein the video content field includes an identity of a video file in the multimedia presentation;
a picture content field, wherein the picture content field includes an identity of a picture file in the multimedia presentation;
a song content field, wherein the song content field includes an identity of a song file in the multimedia presentation;
a time description field, wherein the time description field includes a time when a video, picture, or song is to be played in the multimedia presentation and a duration of how long a video, picture, or song is to be played in the multimedia presentation;
a format of the presentation description field, wherein the format of the presentation description field includes a transition between two or more videos, pictures, or songs;
a format of media description field, wherein the format of media description field includes a format for a video or picture to be played in the multimedia presentation; and
a format of music description field, wherein the format of music description field includes a format for a song to be played in the multimedia presentation.

18. The system as defined in claim 14, wherein the user computer comprises:
a second processor that reads and executes a second computer executable module;
a second memory, in communication with the second processor, that stores and sends the second computer executable module to the second processor; and
the second computer executable modules comprising:
a web interface that sends signals to the server;
a user interface that receives a signal from a user;
a second multimedia database that stores the second multimedia file;
a display engine, in communication with the web interface, the user interface, and the second multimedia database, that:
receives a selection of the second multimedia file from the user interface to include in the multimedia presentation, wherein the second multimedia file is stored locally in the second multimedia database;
inserts the multimedia file into the multimedia presentation;
determines an arrangement for the multimedia presentation;
receives a format for the multimedia presentation; and
provides the multimedia presentation to the user interface.

19. The system as defined in claim 18 further comprising:
a device requirements database;
a translator, in communication with the device requirements database and the content engine, that:
receives a designation for a display device to be used to display the multimedia presentation;
retrieves a specification for the display device;
translates the multimedia presentation into a format compatible with the display device; and
provides the translated multimedia presentation to a user.

20. A computer program product including computer executable instructions stored on a non-transitory computer readable medium which, when executed by a processor of a computer, cause the computer to perform a method for generating a multimedia presentation, the method comprising:

receiving a selection of a multimedia file to include in the multimedia presentation, wherein the multimedia file is stored on a server;
receiving the multimedia file from the server;
in response to receiving the multimedia file, inserting the multimedia file into the multimedia presentation;
determining an arrangement for the multimedia presentation;
receiving a format for the multimedia presentation;
translating the general format file into a multimedia file;
receiving a second selection of a second multimedia file to include in the multimedia presentation;
receiving a directive to send a user to a third party provider;
sending the user to the third party provider;
determining if the user has downloaded a third multimedia file from the third party provider;
receiving the third multimedia file to include in the multimedia presentation, wherein the third multimedia file is provided by the third party provider; and
providing the translated multimedia presentation to a user.

21. The computer program product as defined in claim 20, wherein the multimedia file is one of a group consisting of: a picture, a graphic, a video, a song.

22. The computer program product as defined in claim 20 wherein the second multimedia file is stored locally in a multimedia database.

23. The computer program product as defined in claim 20 further comprising:
- instructions to receive a designation of a display device that is to be used to display the multimedia presentation;
- instructions to retrieve device requirements for the designate display device; and
- instructions to translate the general format file into the multimedia file compatible with the device requirements.

* * * * *